(12) United States Patent
Nishiyama

(10) Patent No.: US 6,571,768 B1
(45) Date of Patent: Jun. 3, 2003

(54) VEHICLE DECELERATION FORCE CONTROL DEVICE AND CONTROL METHOD THEREOF

(75) Inventor: Keiichi Nishiyama, Brussels (BE)

(73) Assignee: Toyota Jidosha Kabushiki Kaisha, Toyota (JP)

( * ) Notice: Subject to any disclaimer, the term of this patent is extended or adjusted under 35 U.S.C. 154(b) by 134 days.

(21) Appl. No.: 09/714,975

(22) Filed: Nov. 20, 2000

(30) Foreign Application Priority Data

Nov. 19, 1999 (JP) .......................................... 11-330041

(51) Int. Cl.[7] ............................................. F02M 51/00
(52) U.S. Cl. .................... 123/406.5; 123/492; 123/493; 701/104; 701/110; 701/115
(58) Field of Search .............................. 123/406.5, 492, 123/493; 701/104, 110, 115

(56) References Cited

U.S. PATENT DOCUMENTS

| | | | |
|---|---|---|---|
| 4,771,752 A | * | 9/1988 | Nishimura et al. ......... 123/489 |
| 4,787,044 A | * | 11/1988 | Nagata et al. .......... 364/431.07 |
| 4,964,051 A | * | 10/1990 | Sekozawa et al. ..... 364/431.04 |
| 4,996,965 A | * | 3/1991 | Onari et al. ................. 123/492 |
| 5,048,495 A | * | 9/1991 | Onari et al. ................. 123/492 |
| 5,924,508 A | | 7/1999 | Clauss et al. |
| 6,076,036 A | * | 6/2000 | Price et al. .................... 701/93 |
| 6,321,722 B1 | * | 11/2001 | Nakano ....................... 123/493 |

FOREIGN PATENT DOCUMENTS

| | | |
|---|---|---|
| DE | 198 07 369 A1 | 8/1999 |
| JP | 9-95222 | 4/1997 |
| JP | 9-272419 | 10/1997 |
| JP | 10 297451 A | 11/1998 |

\* cited by examiner

*Primary Examiner*—Bibhu Mohanty
(74) *Attorney, Agent, or Firm*—Oliff & Berridge, PLC

(57) ABSTRACT

A vehicle deceleration force control device of the invention reduces deceleration force (assist braking force) during implementation of engine brake assist control over a predetermined time ($t_2$–$t_0$) when a vehicle state is changed to an acceleration state by operation of an accelerator. A change amount of the deceleration force over time during reduction is limited to a predetermined value or less. This predetermined value is set to a larger value the steeper the road gradient during hill descent and is set to a smaller value the steeper the road gradient during hill climbing. The vehicle deceleration force control device enables smooth acceleration when shifting from deceleration to acceleration.

18 Claims, 6 Drawing Sheets

VEHICLE DECELERATION FORCE CONTROL DEVICE AND CONTROL METHOD THEREOF

The disclosure of Japanese Patent Application No. 11-330041 filed on Nov. 19, 1999 including the specification, drawings and abstract is incorporated herein by reference in its entirety.

BACKGROUND OF THE INVENTION

1. Field of the invention

The invention relates to a vehicle deceleration force control device and control method thereof for adding a deceleration force to a vehicle, and more particularly to a vehicle deceleration force control device and control method thereof for adding deceleration force to a vehicle in accordance with an operation state of an accelerator.

2. Description of the Related Art

There is known a braking force control device that adds deceleration force to a vehicle by actuating a braking force upon release of a depressed accelerator pedal by a driver. Japanese Patent Application Laid-Open Publication No. 9-95222 discloses a deceleration force control device that adds braking force to a main brake system through the braking force control device when the accelerator pedal is in a deceleration range.

In a vehicle providing such a braking force control device, a brake pedal does not need to be operated frequently when gently accelerating or decelerating the vehicle and the deceleration responsiveness is enhanced. Accordingly, driving is made easier.

However, according to the above-mentioned braking force control device, there is a problem that driveability deteriorates when the accelerator pedal is depressed from a deceleration range to an acceleration range, due to a rapid decrease of braking force to the vehicle, which leads to discontinuous deceleration and acceleration from a point where the vehicle's deceleration stops up to a point where and the vehicle starts accelerating.

SUMMARY OF THE INVENTION

Accordingly, in view of the above-mentioned problem, it is an object of the invention to provide a vehicle deceleration force control device and control method thereof that enables smooth acceleration when shifting from deceleration to acceleration.

To solve the above problem, a vehicle deceleration force control device, which is a first aspect of the invention, includes an accelerator operation state detector which detects the accelerator operation state of a driver, a deceleration force adding device which adds deceleration force to the vehicle, and a control portion which adds the deceleration force by controlling the deceleration force adding device when it is determined from the detection results of the acceleration operation state detector that the accelerator operation state is in a return operation state. The control portion implements a deceleration force limiting control for reducing the deceleration force to be added by the deceleration force adding device over a time equal to or greater than a predetermined time when it is determined that the accelerator operation state has changed to an acceleration operation state when deceleration force is being added to the vehicle by controlling the deceleration force adding device.

According to the invention, the vehicle can be smoothly decelerated by actively adding deceleration force thereto when the accelerator operation state is in a return operation state. When a driver operates the accelerator to shift from a deceleration state to an acceleration state, the deceleration force is reduced over a predetermined time or longer. Accordingly, an acceleration shock generated by a rapid decrease of deceleration force before a driving force of an engine actually increases and achieves acceleration is controlled, thereby enabling natural and smooth acceleration.

It is preferred that the control portion implement this deceleration force limiting control by controlling the change amount of deceleration force over time that is added by the deceleration force adding device at a predetermined value or less. Accordingly, a shift from a deceleration state to an acceleration state can be made smoothly.

In the first aspect, a gradient determination device for determining a road gradient may further be provided. It is preferred that the control portion set a predetermined value for limiting the change amount over time according to the determination results of the gradient determination device. Further, it is preferred that the predetermined value be set to a larger value the steeper the road gradient during hill climbing, and to a smaller value the steeper the road gradient during hill descent. During hill climbing, since deceleration force is added by gravitational force the steeper the road gradient, the vehicle speed decreases even if deceleration force is not actively added. Accordingly, even when the added deceleration force is rapidly decreased, the decrease in the actual vehicle speed is small. That is, the acceleration shock to the driver as a consequence of rapid decrease of deceleration force is small. Also, since more acceleration force is added by gravitational force the steeper the road gradient during hill descent, it is necessary to gradually reduce the deceleration force.

It is preferred that this deceleration force adding device add deceleration force by controlling the braking force. In the case where a mechanism which assists the braking force with respect to the brake operation force is adopted, the invention can be realized with a simple modification.

A vehicle deceleration force control method, which is another aspect of the invention, detects an accelerator operation state of a driver, determines whether or not the accelerator operation state is in a return operation state based on the detected acceleration operation state, adds a deceleration force to the vehicle when it is determined that the acceleration operation state is in the return operation state, determines whether or not the accelerator operation state has changed to an acceleration operation state while the deceleration force is being added to the vehicle, and reduces the deceleration force added to the vehicle over a time equal to or greater than a predetermined time when it is determined that the accelerator operation state has changed to the accelerator operation state.

According to this aspect, the rapid decrease of deceleration force is controlled when the deceleration state is changed to an acceleration state by accelerator operation during engine brake assist control, leading to a smooth shift from deceleration to acceleration, thereby improving driveability.

DETAILED DESCRIPTION OF THE PREFERRED EMBODIMENTS

Figure 1:
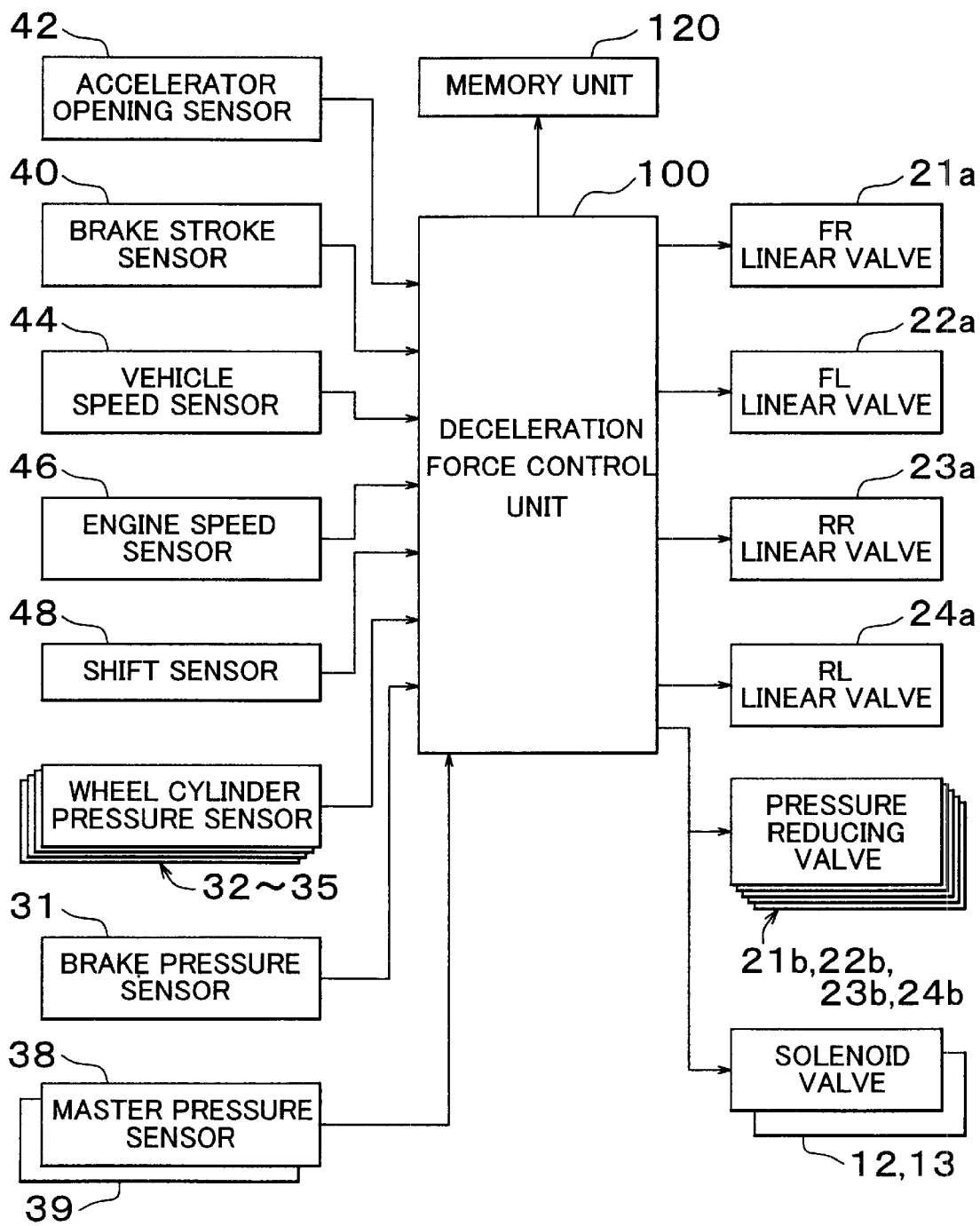
FIG. 1 is an illustration of a configuration of a deceleration force control device according to the invention.

Hereinafter, preferred embodiments of the invention will be described in detail with reference to the attached drawings. For the purpose of facilitating the understanding of the description, same elements will be denoted by same reference numerals as much as possible in the respective drawings, so as to omit redundant description.

Figure 2:
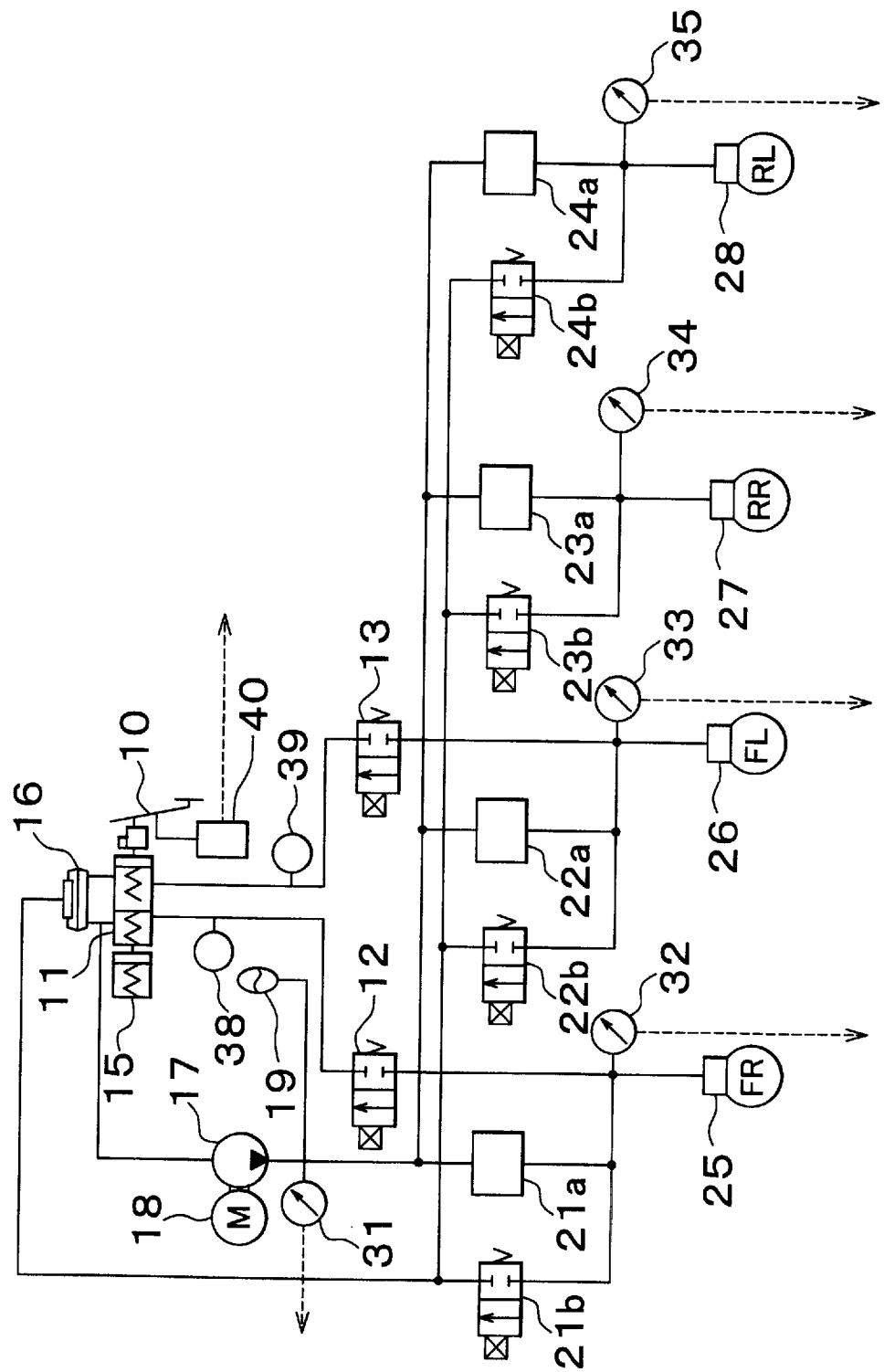
FIG. 2 is an illustration of a configuration of a brake system of a vehicle equipped with the deceleration force control device according to the invention.
Figure 3:
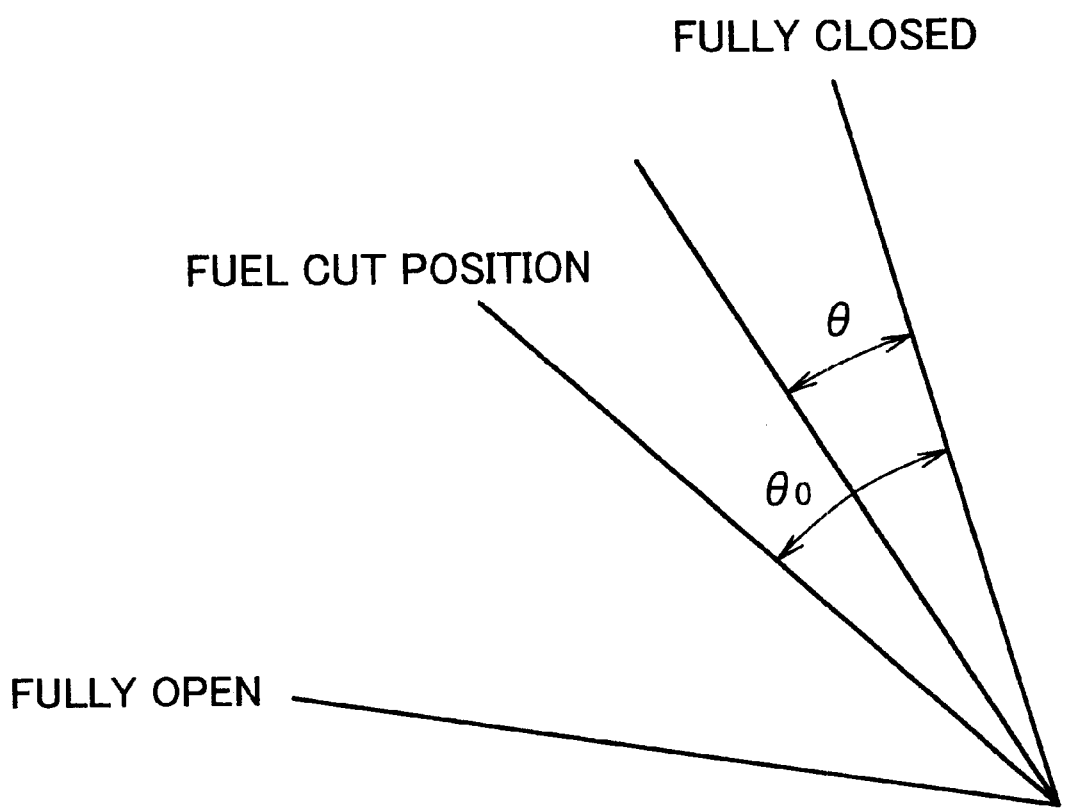
FIG. 3 is an illustration explaining an accelerator pedal opening.

FIG. 1 illustrates the configuration of the deceleration force control system including the deceleration force control device according to the invention, and FIG. 2 illustrates the configuration of a brake system of a vehicle equipped with the deceleration force control device according to the invention. First, the configuration of the brake system of a vehicle will be described with reference to FIG. 2. Front wheels FR and FL and rear wheels RR and RL of this vehicle are provided with wheel cylinders 25 through 28 for wheel braking, respectively. This construction is used for vehicle braking.

A brake pedal 10 for operating this brake system is connected to a piston shaft of a master cylinder 11. The brake pedal 10 is connected with a brake pressure sensor for detecting an operation state of the brake pedal. The master cylinder 11 is connected with a stroke simulator 15 opposite the brake pedal 10, which generates a reasonable amount of reaction force against operation of the brake pedal 10.

Two hydraulic fluid lines extending from this master cylinder 11 are connected to wheel cylinders 25 and 26 of the right front wheel FR and the left front wheel FILM 16, respectively, through respective solenoid valves 12 and 13. A pressure sensor 38 (39) is disposed in a path leading from the master cylinder 11 to the solenoid valve 12 (13).

A hydraulic fluid line extending from a reservoir tank 16 is connected to a pump 17 driven by a motor 18. The hydraulic fluid line extending from the pump 17 is connected to the wheel cylinders 25 through 28 of the respective wheels through linear valves 21a through 24a. A brake pressure sensor 31 and an accumulator 19 are disposed between the pump 17 and branching portions of the linear valves 21a through 24a. Also, pressure reducing valves 21b through 24b are connected to a hydraulic fluid line that returns to a reservoir tank 16 from the respective wheel cylinders 25 through 28. Wheel cylinder pressure sensors 32 through 35 are attached to the respective wheel cylinders 25 through 28.

Respective output signals from an accelerator opening sensor 42, a brake stroke sensor 40, a vehicle speed sensor 44, an engine speed sensor 46, a shift sensor 48, wheel cylinder pressure sensors 32 through 35, a brake pressure sensor 31, and master pressure sensors 38 and 39 are sent to a deceleration force control unit 100 that comprises a control portion of the vehicle deceleration force control device according to the invention.

Further, the deceleration force control unit 100 has a memory unit 120 for storing a table or a constant used for deceleration force control, and controls the linear valves 21a through 24a and pressure reducing valves 21b through 24b connected to the respective wheel cylinders 25 through 28 and solenoid valves 12 and 13.

Now, an operation of the brake system during braking will be described. When the brake pedal 10 is depressed, the piston shaft of the master cylinder 11 is pushed and hydraulic pressure (master pressure) corresponding to an operation amount is generated. In a normal state, the solenoid valves 12 and 13 are cutoff, and therefore the master pressure is never transmitted directly to the wheel cylinder 25 of the right front wheel FR and the wheel cylinder 26 of the left front wheel FL. The hydraulic fluid fed from the reservoir tank 16 in accordance with the operation amount of the master cylinder 11 is pressurized by the pump 17 driven by the motor 18 and the accumulator 19. Then, the hydraulic fluid is supplied in parallel to the wheel cylinder 25 of the right front wheel FR through the FR linear valve 21a, the wheel cylinder 26 of the left front wheel FL through the FL linear valve 22a, the wheel cylinder 27 of the right rear wheel RR through the RR linear valve 23a, and the wheel cylinder 28 of the left rear wheel RL through the RL linear valve 24a. At this time, by controlling each of the linear valves 21a through 24a independently with the deceleration force control unit 100, the hydraulic pressure (wheel cylinder pressure) of each of the wheel cylinders 25 through 28 can be adjusted independently. Consequently, it is possible to independently control the braking force applied to each wheel. The hydraulic fluid is returned to the reservoir tank 16 through the pressure reducing valves 21b through 24b connected to the respective wheel cylinders 25 through 28.

When there is an abnormality in the brake system, both front wheels FR and FL are controlled such that the solenoid valves 12 and 13 are in a conducted state to transmit the master pressure of the master cylinder 11 to the wheel cylinder 25 of the right front wheel FR and the wheel cylinder 26 of the left front wheel FL through the solenoid valves 12 and 13.

The deceleration force control device according to the invention further implements deceleration force control for assisting an engine brake effect which tends to be insufficient in a vehicle equipped with an automatic transmission, by generating deceleration force by adding braking force when the depressed accelerator pedal is returned. Hereafter, this will be referred to as engine brake assist control.

Specifically, the deceleration force control unit 100 monitors the operation state of the accelerator pedal based on the output signals from the accelerator opening sensor 42 attached to the accelerator pedal. When the accelerator pedal is returned from a depressed state, an engine control unit, not shown, reduces the supply of fuel and air so as to reduce the engine speed. Engine resistance generated at that time causes braking force to be generated. Generation of such braking force is called engine brake effect. At this time, if the accelerator pedal is returned from a fuel cutoff position (fuel cut position, accelerator opening $\theta_0$) to a fully closed position (accelerator opening 0), the deceleration force control unit 100 determines that the accelerator pedal is in a return operation state. Accordingly, each of the linear valves 21a through 24a and the pressure reducing valves 21b through 24b are controlled to adjust the hydraulic pressure acting on the wheel cylinders 25 through 28 of the respective wheels so as to add a predetermined braking force (assist braking force), thereby slowing the vehicle. In the intermediate and high speed range, fuel supply to the engine is cutoff by the engine control unit at the point where the accelerator pedal is returned to the fully closed position from the fuel cutoff position to obtain a larger deceleration force.

Next, deceleration force control of a vehicle at switch over from deceleration to acceleration will be described in detail. Here, FIG. 4A and FIG. 4B are graphs showing the change of the accelerator opening and the assist braking force over time after the switchover.

Figure 4A:
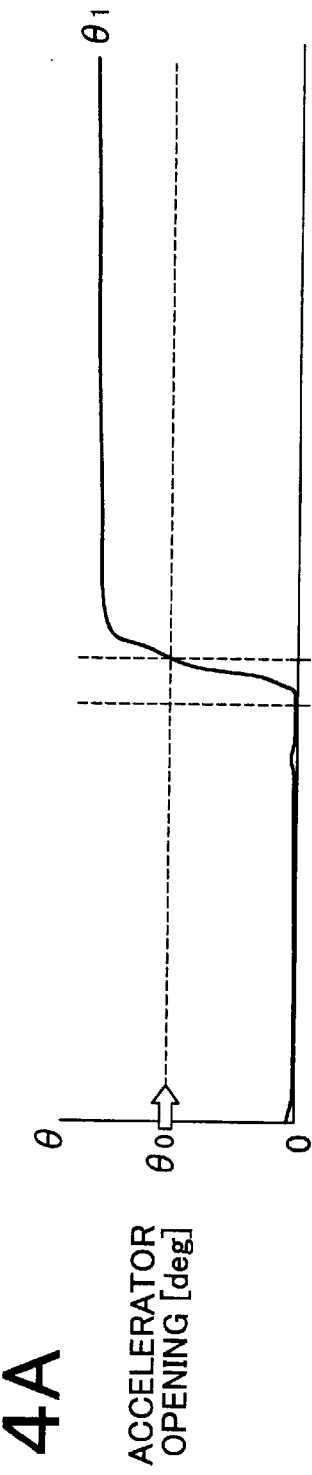
FIG. 4 is a time chart for explaining an operation of the deceleration force control device according to the invention.
Figure 4B:
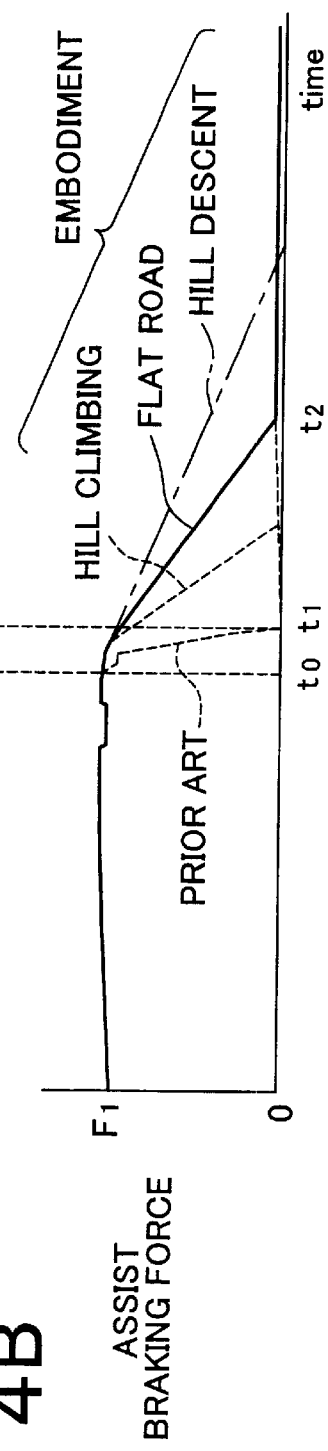

As shown in FIG. 4A, up to time $t_0$ where the accelerator pedal is in a fully closed state (accelerator opening 0), the accelerator pedal is in the aforementioned return operation state. Accordingly, the deceleration force control unit 100 controls the linear valves 21a through 24a and the pressure reducing valves 21b through 24b to adjust the hydraulic pressure acting on the wheel cylinders 25 through 28 of the respective wheels. Thus, a predetermined assist braking force $F_1$ is added (see FIG. 4B).

When the accelerator pedal is depressed at time $t_0$, the accelerator opening exceeds $\theta_0$, which is the fuel cut position at time $t_1$, and ultimately reaches $\theta_1$. At this time, according to a conventional assist braking force control, the assist braking force rapidly decreases from the instant the accelerator pedal is depressed (time $t_0$) until the time (time $t_1$) the accelerator pedal is depressed passed the fuel cut position. On the other hand, if fuel cut is being implemented, the fuel is actually supplied to the engine when the accelerator opening becomes $\theta_0$ or more (after time $t_1$ on). Also, since there is time lag between the time the driving power of the engine is increased and the time the vehicle is accelerated, shifting of a vehicle from deceleration to acceleration was not smooth, which caused discomfort to the driver.

In this embodiment, taking an example of a flat road, the deceleration force control unit 100 decreases the assist braking force over a certain period of time up to time $t_2$ after the vehicle actually starts accelerating, later than time $t_1$. That is, the assist braking force is decreased over a time equal to or greater than a predetermined time $(t_2-t_0)$. Accordingly, a decelerating vehicle can smoothly shift to acceleration, and the driver can drive without feeling discomfort, thus improving driveability. Also, if a road has a gradient, for example, during hill descent, the assist braking force is decreased over a longer period of time than when on a flat road, while the assist braking force is decreased over a shorter period of time than when on a flat road during hill climbing. Gravitational force acts as a deceleration force on the vehicle during hill climbing, while it acts as an acceleration force during hill descent such that the assist braking force is increased or decreased accordingly.

Figure 5:
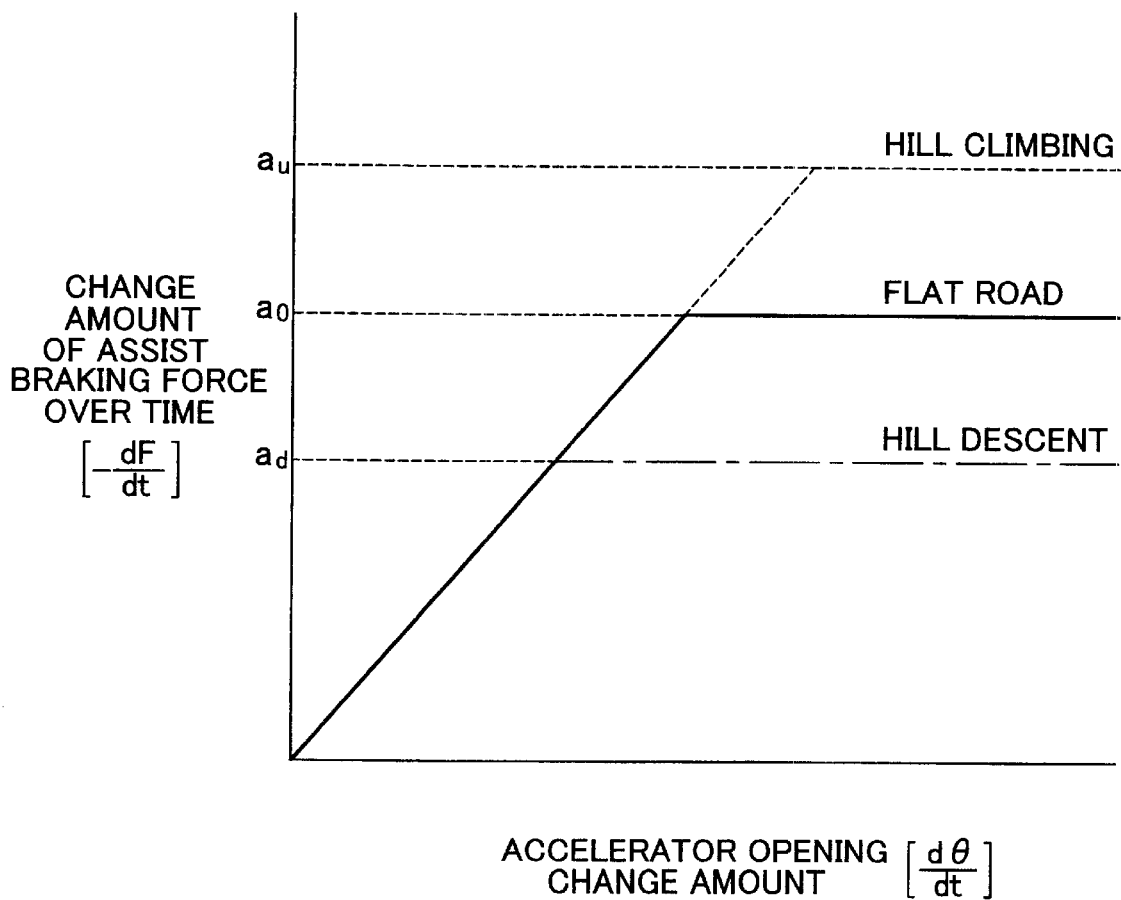
FIG. 5 is a graph illustrating a relationship between an accelerator opening change amount and a change amount of assist braking force over time.

FIG. 5 is a graph showing the relationship between the change amount of accelerator opening over time and the change amount of assist braking force over time. When reducing the assist braking force, it is preferable that a reduction amount of an assist braking force F per unit time $(-dF/dt)$ be controlled at a limit value a or less. This reduction amount of the assist braking force F per unit time $(-dF/dt)$ is basically proportional to the accelerator opening change $(d\theta/dt)$. As shown in FIG. 5, the limit value a need only be set as the upper limit of $-dF/dt$. A limit value $a_u$ during hill climbing shall be set to a value larger than a limit value $a_0$ when on a flat road, while a limit value ad during hill descent is set to a value smaller than the limit value $a_d$ when on a flat road.

Figure 6:
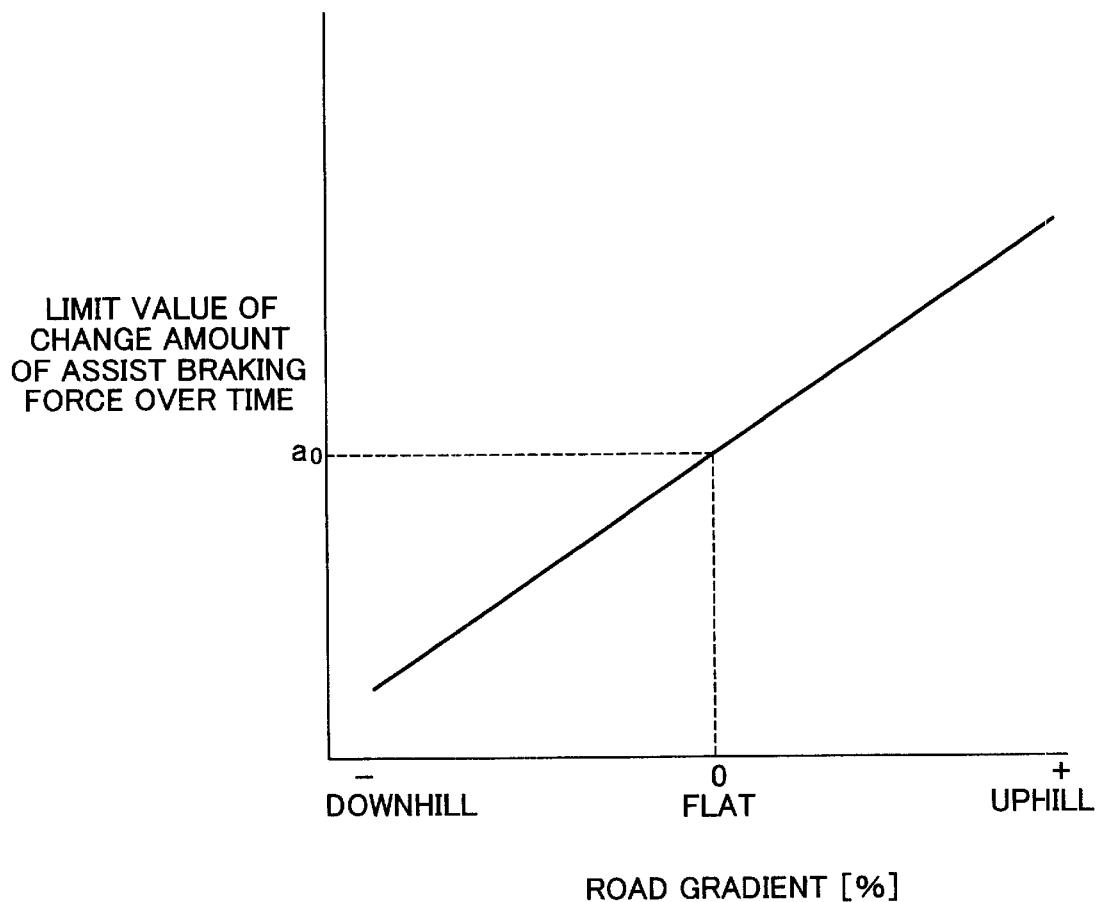
FIG. 6 is a graph showing the relationship between road gradient and a limit value of the change amount of assist braking force over time.

FIG. 6 is a graph showing the relationship between road gradient and the limit value of the change amount of assist braking force over time. As shown here, the limit value a may be varied continuously in accordance with the road gradient.

The determination of the road gradient may be made using a gyro sensor. Alternatively, the road gradient may be determined by a method to determine whether or not a vehicle is on a gradient road using a navigation system, or a method to determine a vehicle state based on output from an engine speed sensor 46, a vehicle speed sensor 44, a shift sensor 48, an accelerator opening sensor 42, and the like.

Although the description heretofore has been given regarding an embodiment wherein the deceleration force is obtained by directly controlling the brake system, the configuration may be such that the deceleration is obtained by acting on the drive system.

According to the invention described above, a rapid decrease of braking force is controlled while engine brake assist control is being implemented when the vehicle state is changed to an acceleration state through operation of the accelerator. Therefore, the shift from a deceleration state to an acceleration state is smooth, improving driveability.

What is claimed is:

1. A vehicle deceleration force control device, comprising:

a detector which detects an accelerator operation state of a driver;

an adding device which adds a deceleration force to a vehicle substantially irrespective of an operation state of an engine; and a control portion which adds the deceleration force by controlling the adding device when it is determined that an accelerator pedal is returned to a predetermined position based on a detection result of the detector, and which implements deceleration force limiting control for reducing the deceleration force to be added by the adding device over a time equal to or greater than a predetermined time when it is determined that the accelerator operation state has changed to an acceleration operation state while the deceleration force is being added to the vehicle by controlling the adding device, wherein the control portion reduces the deceleration force over time equal to or greater than the predetermined time so that the deceleration force is still added when the accelerator pedal reaches the predetermined position after the accelerator operation state has changed to the acceleration operation state.

2. The control device according to claim 1, wherein:

the control device implements the deceleration force limiting control by controlling the change amount over time of the deceleration force added by the adding device to a predetermined value or less.

3. The control device according to claim 2, further comprising:

a determination device for determining a gradient of a road on which a vehicle is travelling, wherein:

the control portion sets the predetermined value in accordance with a determination result of the determination device.

4. The control device according to claim 3, wherein:

the control portion sets the predetermined value to a larger value the steeper the road gradient during hill climbing of the vehicle.

5. The control device according to claim 3, wherein:

the control portion sets the predetermined value to a smaller value the steeper the road gradient during hill descent of the vehicle.

6. The control device according to claim 3, wherein:

the control portion sets the predetermined value to a larger value during hill climbing of the vehicle than when on a flat road.

7. The control device according to claim 3, wherein:

the control portion sets the predetermined value to a smaller value during hill descent of the vehicle than when on a flat road.

8. The control device according to claim 1, wherein:

the adding device adds a deceleration force to the vehicle by controlling braking force.

9. The control device according to claim 1, wherein:

the control portion restricts a rapid decrease of the deceleration force to be applied to the vehicle per unit time by implementing the deceleration force limiting control.

10. A vehicle deceleration force control method, comprising the steps of:

detecting an accelerator operation state of a driver;

determining whether or not an accelerator pedal is returned to a predetermined position based on the detected accelerator operation state;

adding a deceleration force to a vehicle substantially irrespective of an operation state of an engine when it is determined that the accelerator operation state is in a return operation state;

determining whether or not the accelerator operation state has changed to an acceleration operation state while the deceleration force is being added to the vehicle; and implementing deceleration force limiting control for reducing the deceleration force added to the vehicle over a time equal to or greater than a predetermined time when it is determined that the accelerator operation state has changed to an acceleration operation state, wherein reducing the deceleration force over time equal to or greater than the predetermined time occurs so that the deceleration force is still added when the accelerator pedal reaches the predetermined position after the accelerator operation state has changed to the acceleration operation state.

11. The control method according to claim 10, wherein:

the deceleration limiting control is implemented by controlling a change amount of deceleration force to be added to the vehicle over time to a predetermined value or less.

12. The control method according to claim 11, further comprising the step of:

determining a gradient of a road on which the vehicle is travelling, wherein:

the predetermined value is set in accordance with the gradient determination.

13. The control method according to claim 12, wherein:

the predetermined value is set to a larger value the steeper the road gradient during hill climbing of the vehicle.

14. The control method according to claim 12, wherein:

the predetermined value is set to a smaller value the steeper the road gradient during hill descent of the vehicle.

15. The control method according to claim 12, wherein:

the predetermined value is set to a larger value during hill climbing of the vehicle than when on a flat road.

16. The control method according to claim 12, wherein:

the predetermined value is set to a smaller value during hill descent of the vehicle than when on a flat road.

17. The control method according to claim 10, wherein:

the deceleration force is added to the vehicle by controlling braking force.

18. The control method according to claim 10, wherein:

a rapid decrease of the deceleration force to be applied to the vehicle per unit time is controlled by implementing the deceleration force limiting control.

* * * * *